United States Patent
Gong et al.

(10) Patent No.: US 11,261,940 B2
(45) Date of Patent: Mar. 1, 2022

(54) PLANET CARRIER ASSEMBLY FOR VEHICLE DOOR CLOSING ACTUATOR

(71) Applicant: GUANGDONG ZHAOQING L&V CO. LTD., Guangdong (CN)

(72) Inventors: Hongyu Gong, Guangdong (CN); Yuan Jiang, Guangdong (CN); Xianghuai Qiu, Guangdong (CN); Qingchun Yang, Guangdong (CN)

(73) Assignee: GUANGDONG ZHAOQING L&V CO. LTD., Guangdong (CN)

( * ) Notice: Subject to any disclaimer, the term of this patent is extended or adjusted under 35 U.S.C. 154(b) by 0 days.

(21) Appl. No.: 17/059,001

(22) PCT Filed: Apr. 23, 2019

(86) PCT No.: PCT/CN2019/083796
§ 371 (c)(1),
(2) Date: Nov. 25, 2020

(87) PCT Pub. No.: WO2019/228100
PCT Pub. Date: Dec. 5, 2019

(65) Prior Publication Data
US 2021/0239186 A1 Aug. 5, 2021

(30) Foreign Application Priority Data
Jun. 1, 2018 (CN) .......................... 201820848658.1

(51) Int. Cl.
*F16H 57/08* (2006.01)
*F16H 1/32* (2006.01)
*F16H 57/023* (2012.01)

(52) U.S. Cl.
CPC ............. *F16H 1/32* (2013.01); *F16H 57/023* (2013.01); *F16H 57/082* (2013.01); *F16H 2001/327* (2013.01)

(58) Field of Classification Search
CPC .... F16H 1/32; F16H 57/023; F16H 2001/327; F16H 57/082; E05Y 2201/72; E05F 15/655
See application file for complete search history.

(56) References Cited

U.S. PATENT DOCUMENTS 4,043,021 A * 8/1977 Mosbacher ........... F16H 57/082
29/437
7,329,203 B2 * 2/2008 Radinger .............. F16H 57/082
29/893

(Continued)

FOREIGN PATENT DOCUMENTS

CN 201190767 Y 2/2009
CN 204327938 U * 5/2015 ........... F16H 57/082

(Continued)

OTHER PUBLICATIONS

International Search Report with Written Opinion for related Application No. PCT/CN2019/083796 dated Jun. 28, 2019 (11 Pages including English Translation).

*Primary Examiner* — Sherry L Estremsky
(74) *Attorney, Agent, or Firm* — Michael Best & Friedrich LLP

(57) ABSTRACT

The present application relates to a planet carrier assembly for a vehicle door closing actuator. The planet carrier assembly comprises a plurality of planetary gears and a planet carrier body. The planet carrier body comprises a disc portion, a cover portion and an output shaft portion, wherein the plurality of planetary gears are rotatably mounted on the disc portion via a corresponding number of mounting shafts fixed to the disc portion, one end of the mounting shaft protruding from a central hole of the planetary gear is pressed into a corresponding receiving hole on the cover portion, and the planet carrier body is further provided with a rotation locking device to prevent the cover portion from (Continued)

rotating circumferentially relative to the disc portion. The planet carrier assembly according to the present application has the advantages such as low cost, high strength, and simple assembly.

10 Claims, 4 Drawing Sheets

(56) References Cited

U.S. PATENT DOCUMENTS

| | | | |
|---|---|---|---|
| 9,776,483 B2* | 10/2017 | Shchokin | F16H 25/20 |
| 2021/0116019 A1* | 4/2021 | Port | F16H 1/2863 |
| 2021/0140516 A1* | 5/2021 | Gong | F16H 1/32 |

FOREIGN PATENT DOCUMENTS

| | | | | |
|---|---|---|---|---|
| CN | 205780789 U | 12/2016 | | |
| CN | 206072252 U | 4/2017 | | |
| CN | 206145116 U | 5/2017 | | |
| CN | 208221488 U | 12/2018 | | |
| DE | 3418686 A1 | 10/1985 | | |
| DE | 102014214382 B3 * | 11/2015 | | F16H 57/082 |
| DE | 102015216676 A1 * | 3/2017 | | F16H 57/082 |

* cited by examiner

PLANET CARRIER ASSEMBLY FOR VEHICLE DOOR CLOSING ACTUATOR

CROSS-REFERENCE TO RELATED APPLICATIONS

This application is a 371 National Phase filing of International Patent Application No. PCT/CN2019/083796, filed Apr. 23, 2019, which claims priority to Chinese Patent Application No. 201820848658.1, filed on Jun. 1, 2018, both of which are incorporated herein by reference in their entirety.

TECHNICAL FIELD

The present application relates to the technical field of vehicle, in particular to the field of vehicle door closing actuators, and more specifically to a planet carrier assembly for such actuators.

BACKGROUND ART

Vehicle doors with automatic opening/closing function have gradually become standard configuration of many passenger cars, especially high-end passenger cars. To enable automatic closing of the vehicle door, an actuator for closing the vehicle door is usually provided. The actuator is usually provided with a planetary gear train to make the vehicle door easy to manipulate by reducing the speed and increasing the torque.

There are a variety of planet carrier assemblies used for door closing actuators in the prior art. However, these planet carriers each has its shortcoming: the planet carrier shown in FIG. 1(a) is manufactured as an integral type, resulting in high manufacturing cost and poor replaceability of components; the planet carrier shown in FIG. 1(b) is manufactured as a split-type, wherein the connection and fastening between the disc portion (on which the planetary gears are mounted) and the cover portion of the planet carrier depend on the multiple shafts provided on the disc portion. However, in order to adapt the strength of the entire planet carrier to heavy load conditions, e.g. the door closing, in addition to the mounting shafts for the planetary gears, many redundant connecting shafts shall be arranged additionally on the disc portion, thus making the assembly procedure of the entire planet carrier rather complicated and the cost very high due to the large number of shafts. Different from the "shaft connection" method in FIG. 1(b), the planet carrier shown in FIG. 1(c) uses screws to fix the disc portion and the cover portion, which greatly increases the number of parts and the difficulty to manage these parts. In addition, since the space available for arranging the door closing actuator is limited, usually only small screws can be selected and in this case the screws are prone to failure during the loading process, which makes the strength of the entire planet carrier insufficient to adapt to a heavy load condition.

Therefore, it's necessary to provide a planet carrier assembly for a vehicle door closing actuator with a novel structure to overcome one or more of the above-mentioned problems and/or other shortcomings in the prior art.

SUMMARY OF THE INVENTION

The present application aims to propose a planetary carrier assembly, especially for a vehicle door closing actuator, so that on the one hand the manufacturing cost and difficulty in assembly are reduced, and on the other hand the high mechanical strength requirement of the door closing system can be met.

The planet carrier assembly for a vehicle door closing actuator according to the present application comprises a plurality of planetary gears and a planet carrier body, the planet carrier body comprising a disc portion, a cover portion and an output shaft portion, wherein the plurality of planetary gears are rotatably mounted on the disc portion via a corresponding number of mounting shafts fixed to the disc portion, one end of the mounting shaft protruding from a central hole of the planetary gear being pressed into a corresponding receiving hole on the cover portion, wherein the planet carrier body is further provided with a rotation locking device to prevent the cover portion from rotating circumferentially relative to the disc portion.

Advantageously, the rotation locking device comprises at least two protrusions protruding from a periphery of the cover portion toward the disc portion and at least two recesses recessed radially from a periphery of the disc portion, wherein the protrusions are engaged with the recesses when the mounting shafts are pressed into the corresponding receiving holes of the cover portion.

Advantageously, the output shaft portion is integrally formed from a side of the disc portion away from the planetary gears.

Advantageously, the output shaft portion is provided with a pair of anti-rotation cut surfaces opposite to each other with respect to a central axis.

Advantageously, the anti-rotation cut surfaces cooperate with one end of a door shaft to provide the door shaft with a torque required for opening and closing the vehicle door.

Advantageously, the mounting shafts are integrally formed on the disc portion.

Advantageously, the cover portion is provided with a central through hole for a sun gear of the planetary gear train to pass through to mesh with the plurality of planetary gears.

Advantageously, a gap is provided between the planetary gears and the cover portion and between the planetary gears and the disc portion.

The planet carrier according to the present application has greatly improved the structural strength compared with the planet carrier with small screws in the prior art (see FIG. 1(c)), has greatly decreased the number of shafts used compared with the conventional shaft-connected planet carrier (see FIG. 1(b)), and leads to a lower manufacturing cost and easier arrangement in a restricted structural space compared with the integral type planet carrier (see FIG. 1(a)).

BRIEF DESCRIPTION OF THE DRAWINGS

Other details and advantages of the application will become apparent from the detailed description provided below. It is to be understood that the following drawings are only schematic and are not drawn to scale, and therefore cannot be considered as a limitation of the application. The following is a detailed description with reference to the drawings, in which.

DETAILED DESCRIPTION OF THE EMBODIMENTS

The application will be described in further detail below with reference to the drawings and embodiments.

Figure 1A:
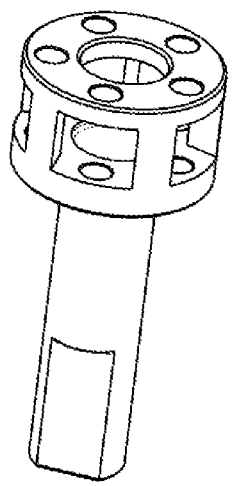
FIGS. 1(a), 1(b) and 1(c) respectively show three possible planet carrier assemblies for vehicle door closing actuators in the prior art.
Figure 1B:
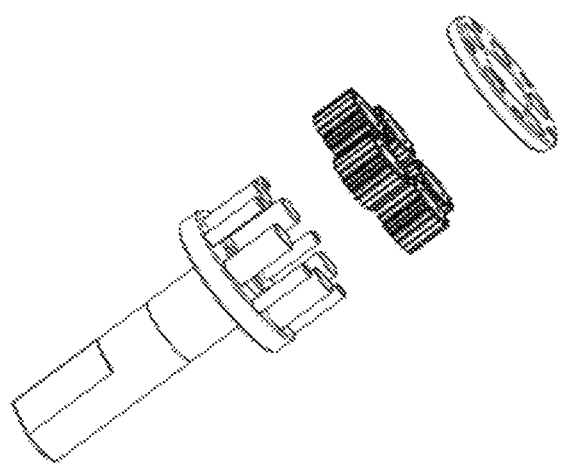
Figure 1C:
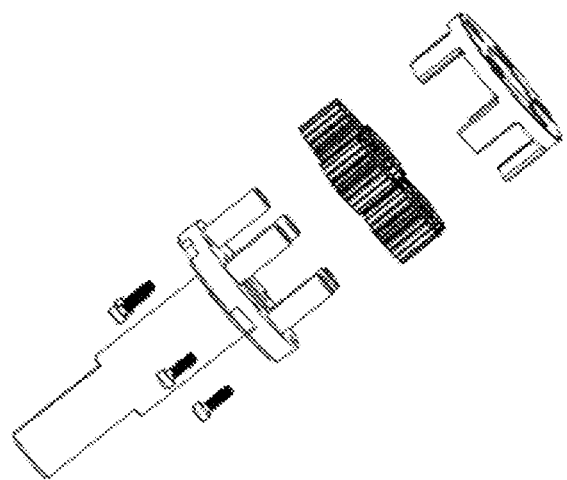
Figure 2:
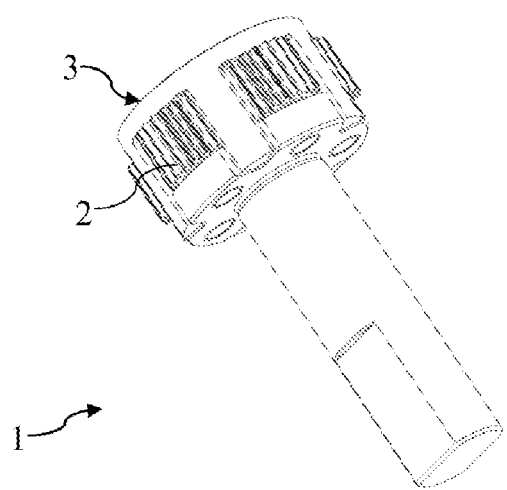
FIGS. 2 and 3 respectively show an assembled perspective view and an exploded perspective view of the planet carrier assembly according to an embodiment of the present application.
Figure 3:
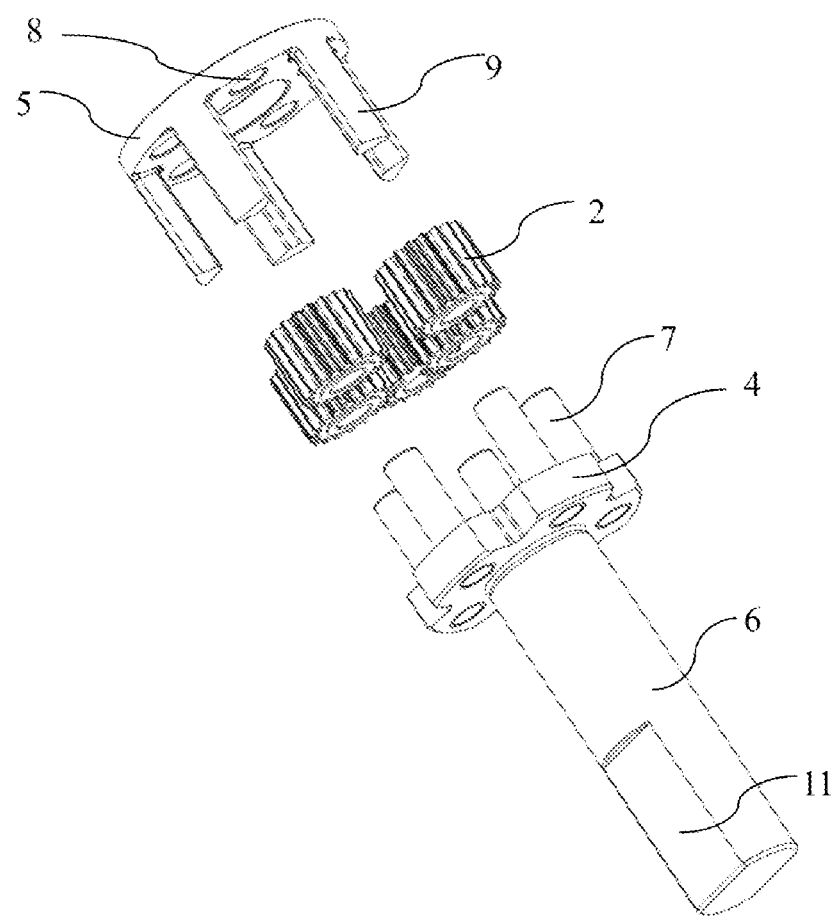
Figure 4:
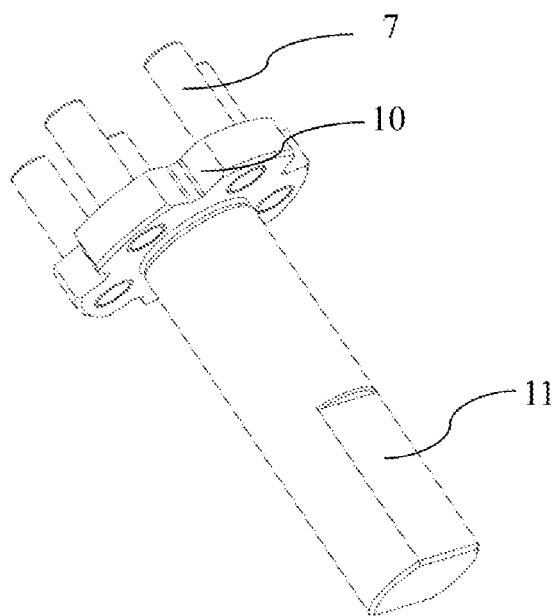
FIGS. 4 and 5 respectively show the disc portion and the cover portion of the planet carrier assembly according to the present application.

In view of the shortcomings of the three types of planet carriers in the prior art as shown in FIG. 1 mentioned in the Background Art, a new type of planet carrier that can better adapt to heavy load environments, e.g. the vehicle door closing, is proposed. FIGS. 2 and 3 respectively show an assembled perspective view and an exploded perspective view of a planet carrier assembly, particularly for a vehicle door closing actuator, according to an embodiment of the present application.

It should be understood that a car with automatic door opening/closing function is usually provided with a door closing actuator, which usually uses a planetary gear train. This not only makes the entire transmission device occupy a small structural space and have a compact structure, but also achieves a large transmission ratio, thus lowering the requirement for the torque of the motor, and reducing the volume and weight of the motor. In addition, by means of the planetary gear train, the power can be input and output along the same axial direction, which greatly improves the operating stability of the actuator.

Specifically, referring to FIG. 2, the planet carrier assembly 1 according to the present application includes a plurality of planetary gears 2 (preferably five, as shown in the figure) and a planet carrier body 3. The planet carrier body 3 includes a disc portion 4, a cover portion 5, and an output shaft portion 6, wherein planetary gears 2 are arranged between the disc portion 4 and the cover portion 5, the planetary gears 2 are rotatably mounted on the disc portion 4 via the mounting shafts 7 extending axially from one side of the disc portion 4, and one end of the mounting shaft 7 protruding from the central hole of the planetary gear 2 is pressed into the corresponding receiving hole 8 on the cover portion 5. In this way, an axial locking of the cover portion 5 with respect to the disc portion 4 is achieved by press-fit of the mounting shaft 7 into the receiving hole 8 of the cover portion 5. Preferably, the mounting shafts 7 for engaging the planetary gears 2 are integrally formed on the disc portion 4.

Advantageously, after the cover portion 5 and the disc portion 4 of the planet carrier body 3 are assembled with the planetary gears 2 (as shown in FIG. 2), there may be a proper gap between the planetary gears 2 and the cover portion 5 and between the planetary gears 2 and the disc portion 4, to avoid undesired friction between the two end surfaces of the planetary gear 2 and the cover portion 5 and the disc portion 4.

The planet carrier body 3 is further provided with a rotation locking device to prevent the cover portion 5 from rotating circumferentially relative to the disc portion 4. Preferably, the rotation locking device includes at least two, preferably five, protrusions 9 protruding from a periphery of the cover portion 5 toward the disc portion 4, and a corresponding number of recesses 10 that are recessed radially along a periphery of the disc portion 4, or a reverse arrangement is also available. The protrusions 9 are engaged with the recesses 10 when the cover portion 5 and the mounting shafts 7 are fixed together.

Figure 5:
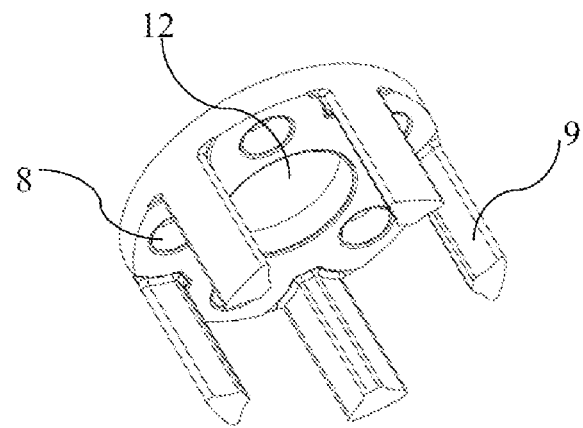

Optionally, the protrusions 9 protruding from the cover portion 5 have a prism-like shape, for example, a triangular prism-like shape as shown in FIG. 5. Accordingly, recesses 10 matching the outer contour of the protrusions 9 are provided on the periphery of the disc portion 4, so that the two side faces of the protrusions 9 can abut against two corresponding side faces of the recesses 10 in a face-contact manner. In this way, the circumferential rotation of the cover portion 5 relative to the disc portion 4 can be well locked. However, those skilled in the art should understand that any suitable device with other configurations or designs that can achieve the circumferential rotation locking function falls within the scope of protection claimed by the present application.

An output shaft portion 6 is integrally formed on a side of the disc portion 4 of the planet carrier body 3 away from the planetary gears 2 to output power therethrough. Especially in the case of a door closing actuator, the output shaft portion 6 is provided with a pair of anti-rotation cut surfaces 11 opposite to each other with respect to the central axis, so as to form a flat free end. The flat free end is particularly used to directly cooperate with one end of the door shaft of the vehicle door, so as to provide the door shaft with the torque required for opening and closing the door. Advantageously, the flat free end extends into a notch with a matching configuration on the end of the door shaft of the vehicle door (not shown in the figures).

In addition to the receiving holes for receiving the mounting shafts 7, the cover portion 5 of the planet carrier body 3 is further provided with a central through hole 12. The sun gear (not shown in the figure) of the planetary gear train used for the door closing actuator can pass through the central through hole 12 and come into engagement with a plurality of planetary gears 2, so that the power can be output via the sun gear, the planetary gears, and finally the output shaft portion of the planet carrier body.

Although only one-stage planetary gear transmission is shown in this application, a multi-stage planetary gear transmission can be envisaged according to the specific torque requirements for door closing. In this case, the planet carrier assembly according to the present application can be used as a modular unit in a multi-stage planetary gear transmission.

The planet carrier assembly according to the present application has a simple and compact structure owing to less parts involved, which greatly reduces the manufacturing cost. In addition, since no fastening elements such as screws are involved, cumbersome installation process is avoided and difficulty in subsequent parts management is alleviated. Furthermore, compared with the integral type planet carrier in the prior art, the planet carrier according to the present application has better accessibility and maintainability.

It should be noted that the embodiments described above should only be regarded as illustrative, and the application is not limited thereto. By considering the content of this specification, those skilled in the art can make various changes and modifications without departing from the scope or spirit of the application. The true scope of the present application is defined by the appended claims and equivalent solutions.

What is claimed is:

1. A planet carrier assembly for a vehicle door closing actuator, the assembly comprising:
   a plurality of planetary gears; and
   a planet carrier body including a disc portion, a cover portion, and an output shaft portion,
   wherein each planetary gear of the plurality of planetary gears is rotatably mounted on the disc portion via a corresponding mounting shaft fixed to the disc portion, one end of each mounting shaft protruding from a central hole of the associated planetary gear pressed into a corresponding receiving hole on the cover portion, wherein the planet carrier body is further provided with a rotation locking device to prevent the cover portion from rotating circumferentially relative to the disc portion, the rotation locking device including at least two protrusions protruding from a periphery of the cover portion toward the disc portion and at least two recesses recessed radially from a periphery of the disc portion such that when the mounting shafts are pressed into the corresponding receiving holes of the cover portion, the protrusions are engaged with the recesses, and wherein the output shaft is integrally formed from a side of the disc portion away from the planetary gears.

2. The planet carrier assembly according to claim 1, wherein the output shaft portion is provided with a pair of anti-rotation cut surfaces opposite to each other with respect to a central axis.

3. The planet carrier assembly according to claim 2, wherein the anti-rotation cut surfaces cooperate with one end of a door shaft to provide the door shaft with a torque required for opening and closing the vehicle door.

4. The planet carrier assembly according to claim 1, wherein the mounting shafts are integrally formed on the disc portion.

5. The planet carrier assembly according to claim 1, wherein the cover portion is provided with a central through hole for a sun gear to pass through for meshing with the plurality of planetary gears.

6. The planet carrier assembly according to claim 1, wherein a gap is provided between the planetary gears and the cover portion and between the planetary gears and the disc portion.

7. A planet carrier assembly for a vehicle door closing actuator, the assembly comprising:
a plurality of planetary gears; and
a planet carrier body including a disc portion, a cover portion, and an output shaft portion,
wherein each planetary gear of the plurality of planetary gears is rotatably mountable on the disc portion via a corresponding mounting shaft fixed to the disc portion, one end of each mounting shaft configured to be press-fit into a corresponding receiving hole in the cover portion,
wherein the planet carrier body includes a protrusion protruding from a periphery of the cover portion, and a recess at the periphery of the disc portion, such that when the mounting shafts are pressed into the corresponding receiving holes of the cover portion, the recess at least partially receives the protrusion, and
wherein the output shaft is integrally formed from a side of the disc portion away from the mounting shafts.

8. The planet carrier assembly of claim 7, wherein the protrusion includes at least two side faces configured to abut two corresponding side faces of the recess.

9. The planet carrier assembly of claim 7, wherein the mounting shafts are integrally formed on the disc portion.

10. A planet carrier assembly for a vehicle door closing actuator, the assembly comprising:
a plurality of planetary gears; and
a planet carrier body including a disc portion having a plurality of mounting shafts affixed thereto, a cover portion, and an output shaft portion integrally formed from a side of the disc portion away from the plurality of mounting shafts,
wherein each planetary gear of the plurality of planetary gears is rotatably mountable on a mounting shaft of the plurality of mounting shafts, and
wherein the planet carrier body includes a protrusion protruding from a periphery of the cover portion, and a recess at the periphery of the disc portion, such that when the mounting shafts engage corresponding receiving holes of the cover portion, the recess at least partially receives the protrusion.

* * * * *